(12) United States Patent
Davey et al.

(10) Patent No.: US 7,914,035 B2
(45) Date of Patent: Mar. 29, 2011

(54) HEADLINER SYSTEM

(75) Inventors: Geoffrey W. Davey, Huntington Woods, MI (US); Matt C. Withun, Troy, MI (US); Normand R. Marceau, Linden, MI (US); Larry F. Kocher, Canton, MI (US)

(73) Assignee: Intier Automotive Inc., Aurora (CA)

( * ) Notice: Subject to any disclaimer, the term of this patent is extended or adjusted under 35 U.S.C. 154(b) by 731 days.

(21) Appl. No.: 11/559,729

(22) Filed: Nov. 14, 2006

(65) Prior Publication Data

US 2007/0132212 A1    Jun. 14, 2007

Related U.S. Application Data

(60) Provisional application No. 60/736,590, filed on Nov. 14, 2005.

(51) Int. Cl.
  *B62D 25/06* (2006.01)
  *B60R 21/20* (2006.01)
(52) U.S. Cl. ............ 280/728.2; 280/728.1; 280/730.2; 296/1.02; 296/214
(58) Field of Classification Search .......... 296/214, 296/1.02; 280/728.2, 730.1, 730.2, 728.3, 280/728.1, 432, 743.1
  See application file for complete search history.

(56) References Cited

U.S. PATENT DOCUMENTS

| | | | | |
|---|---|---|---|---|
| 6,079,735 A * | 6/2000 | Fallmann et al. | ......... | 280/730.2 |
| 6,103,984 A * | 8/2000 | Bowers et al. | ............ | 280/730.2 |
| 6,142,506 A | 11/2000 | Patel et al. | | |
| 6,155,594 A * | 12/2000 | Ibe et al. | ..................... | 280/728.2 |
| 6,237,941 B1 | 5/2001 | Bailey et al. | | |
| 6,257,616 B1 * | 7/2001 | Nowak et al. | ............... | 280/730.2 |
| 6,296,269 B1 * | 10/2001 | Nagai et al. | ................ | 280/728.2 |
| 6,333,515 B1 | 12/2001 | Kubota et al. | | |
| 6,334,626 B2 * | 1/2002 | Nakajima et al. | ........... | 280/730.2 |
| 6,367,872 B1 * | 4/2002 | Bohm et al. | .................. | 296/214 |
| 6,402,188 B1 * | 6/2002 | Pasch | ........................ | 280/728.2 |
| 6,409,210 B1 | 6/2002 | Emerling | | |
| 6,431,584 B1 * | 8/2002 | Nagasawa et al. | ........ | 280/728.2 |
| 6,431,585 B1 * | 8/2002 | Rickabus et al. | .......... | 280/728.3 |
| 6,485,048 B2 | 11/2002 | Tajima et al. | | |
| 6,502,854 B2 | 1/2003 | Mueller | | |
| 6,588,793 B2 * | 7/2003 | Rose | .......................... | 280/728.2 |
| 6,616,222 B1 | 9/2003 | Ponceau | | |
| 6,729,645 B2 * | 5/2004 | Amamori | ................... | 280/730.2 |
| 6,736,421 B2 | 5/2004 | Blake et al. | | |
| 6,761,374 B2 * | 7/2004 | Di Sante et al. | ........... | 280/728.2 |
| 6,863,300 B2 * | 3/2005 | Ryu | ........................... | 280/730.2 |
| 6,913,280 B2 | 7/2005 | Dominissini et al. | | |
| 7,017,942 B2 | 3/2006 | Elqadah et al. | | |
| 7,234,209 B2 * | 6/2007 | Totani et al. | .................... | 24/607 |
| 7,246,817 B2 * | 7/2007 | Tanase | ....................... | 280/730.2 |
| 2001/0052693 A1 | 12/2001 | Mueller | | |
| 2004/0012173 A1 | 1/2004 | Blake et al. | | |
| 2005/0052001 A1 * | 3/2005 | Totani et al. | ............... | 280/728.2 |
| 2009/0096254 A1 * | 4/2009 | Spamer | ......................... | 296/214 |

FOREIGN PATENT DOCUMENTS

WO    WO01/42041    6/2001

\* cited by examiner

*Primary Examiner* — Ruth Ilan
*Assistant Examiner* — James English
(74) *Attorney, Agent, or Firm* — Honigman Miller Schwartz and Cohn LLP

(57) ABSTRACT

An interior trim assembly including vehicle roof structure that supports a headliner-mounted component and a headliner, a separating means proximate a mounting location perimeter of the headliner-mounted component for maintaining a mounting integrity of the headliner-mounted component upon deployment of an inflatable restraint.

7 Claims, 4 Drawing Sheets

US 7,914,035 B2

HEADLINER SYSTEM

TECHNICAL FIELD

This disclosure relates to a vehicle headliner system and to a headliner system that increases the integrity of a connection between a component related to the headliner.

BACKGROUND

In some applications, inflatable restraints move from a stowed state to a deployed state into the passenger compartment of a vehicle. In some applications, the inflatable restraint may pass through at least a portion of a headliner such that the headliner defines at least a portion of the passage for the airbag deployment. It will be appreciated that the headliner may or may not be pre-weakened, may or may not define a door, or the like for the headliner to pass through during deployment. Because the headliner may include one or more components mounted to one of or all of the headliner, supporting structure thereunder or provided in relation therewith, traditionally, the foregoing air bag deployment can transfer a force into the headliner and subsequently affect this connection of the one or more components. It will become appreciated, that this force can affect the connection integrity between the one or more components and the structure to which it is mounted.

The inventors hereof have realized an inventive headliner system that improves and increases the integrity of the connection of the component and the structure to which it is mounted during airbag deployment.

BRIEF DESCRIPTION OF THE DRAWINGS

The disclosure will now be described, by way of example, with reference to the accompanying drawings, in which.

DETAILED DESCRIPTION

The figures illustrate exemplary embodiments of a headliner system in accordance with an embodiment of the invention. For brevity, the disclosure hereof will illustrate and describe a headliner system that improves problems over the prior art. Based on the current disclosure, it will become appreciated that, while the headliner system is exemplarily described herein, it will be appreciated that the headliner system should not be limited to the exemplary embodiment. For example, and among others, the headliner system may be utilized in various applications and the invention should not be limited to exemplary language. In view of the foregoing, it is to be generally understood that the nomenclature used herein is simply for convenience and the terms used to describe the invention should be given the broadest meaning by one of ordinary skill in the art. In this regard, the materials described for the different elements associated with the headliner system are exemplary and the invention should not be limited by the exemplary materials.

Figure 1A:
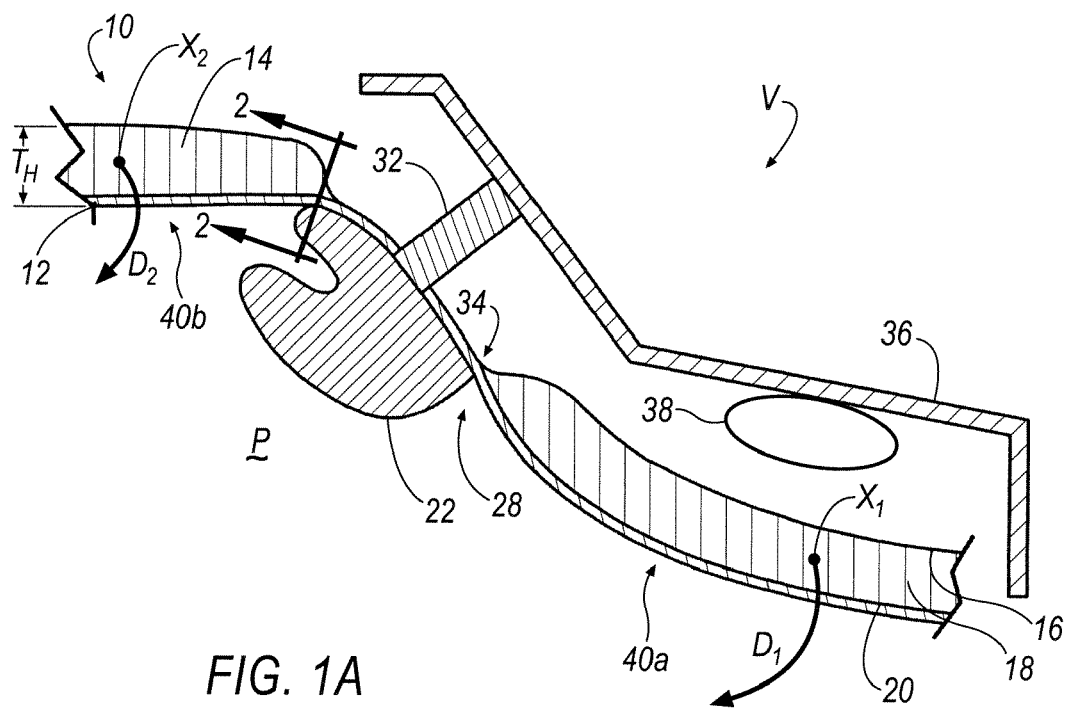
FIG. 1A is a cross-sectional view of a headliner system according to an embodiment.

Referring now to FIG. 1A, a headliner system is shown generally at 10. In an embodiment, at least a portion of the headliner system 10 faces a passenger compartment area, P, of a vehicle, V. As illustrated, the headliner system 10 includes a first, inboard layer of material, which is shown generally at 12 and a second, outboard layer of material, which is shown generally at 14. Layers 12 and 14 define a headliner potential thickness, $T_H$. The first, inboard layer of material 12 may be commonly referred to in the art as an "A-surface" or a "skin surface," thereby providing an exposed side of the headliner 10 that is viewable by passengers within the passenger compartment area, P. As such, it will be appreciated that the first, inboard layer of material 12 may include any desirable material having any desirable characteristic, such as, for example, a fabric, vinyl, leather, or the like.

Although the headliner system 10 is described above to include a first and second layer of material 12, 14, it will be appreciated that the headliner system 10 may be a single layer of material, or a unitary layer having materials at different regions; further, headliner system 10 may comprise any desirable number of layers of material. For example and without limitation, the second, outboard layer of material generally designated at 14 may include a top layer of material 16, a middle layer of material 18, and a bottom layer of material 20. The top layer of material 16 and the bottom layer of material 20 may include, for example, a film material. Thus, the top layer of material 16 and the bottom layer of material 20 are flexible such that they can be formed to a specific shape, but, the thickness of the top and bottom material layers 16, 20 may remain, according to an embodiment, constant. However, it will be appreciated that any material having similar characteristics may be utilized, as desired.

Figure 2A:
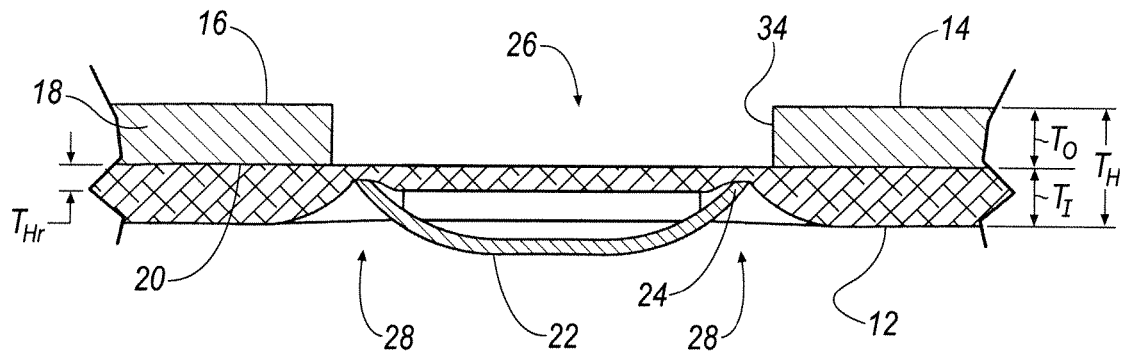
FIG. 2A is a cross-sectional view of the headliner system according to line 2-2 of FIG. 1 according to an embodiment.
Figure 2B:
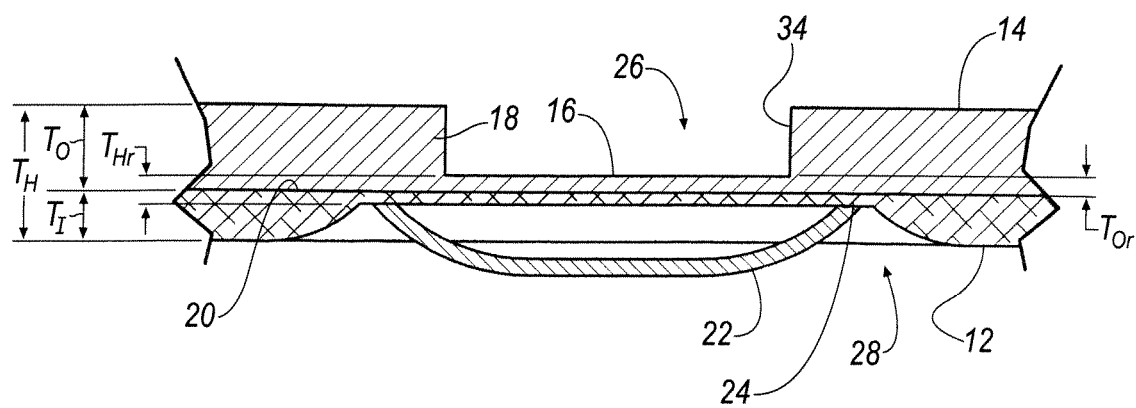
FIG. 2B is a cross-sectional view of the headliner system according to line 2-2 of FIG. 1 according to an embodiment.

According to an embodiment, the middle layer 18 may include a glass-reinforced material, such as, for example, an expandable foam material such that the foam material will form into a specific shape and allow the middle layer of material 18 to have any desirable thickness, $T_O$ (FIGS. 2A, 2B). According to another embodiment, a material that may be utilized for the middle layer 18 may be a polyurethane material. Irrespective of the material utilized for the middle layer 18, it will be appreciated that the thickness, $T_O$, of the second, outboard layer of material 14 may be reduced or increased by trimming, compressing, molding, shaping, or the like to selectively reduce or increase the thickness, $T_O$, by utilizing any desirable methodology so as to create an absence of material thickness, $T_O$ (see, e.g., FIG. 2A), or, a reduced thickness, $T_{Or}$ (see, e.g., FIG. 2B), between the top layer of material 16 and the bottom layer of material 20.

Referring to FIG. 1A, according to an embodiment, the second, outboard layer of material 14 may include, for example, a foamed resin or a rigid substrate having any desirable constant or variable thickness, $T_O$, that may range between approximately, for example, 0 mm-to-50 mm. According to an embodiment, the second, outboard layer of material 14 includes a structural substrate material. By constructing the second, outboard layer of material 14 using a structural substrate material, the second, outboard layer of material 14 can be a more rigid material than the first, inboard layer of material 12. As such, the second, outboard layer of material 14 may have greater strength characteristics with respect to the first, inboard layer of material 12 that allow the second, outboard layer of material 14 to have greater strength.

In an embodiment, the headliner system 10 restricts forces imparted upon the headliner system 10 (e.g., due to forces communicated to the headliner system 10 resulting from deployment of an airbag) from affecting a component 22 arranged proximate to the headliner system 10. In an embodiment, the headliner system 10 defines at least a portion of an air bag deployment passage and a means for separating the headliner around at least a portion of the component 22 when the airbag becomes deployed, wherein the separating means is remote from said air bag deployment passage.

Although the embodiment of the headliner 10 described above and shown in FIG. 1A is directed to a component 22 illustrated as a coat hook, it will be appreciated that the component 22 may be any type of component that can be located in the passenger compartment area, P. For example, the component 22 may be, for example, a grab handle, a dome light, a storage component, or the like.

Referring to the Figures, in an embodiment the component 22 is shown mounted to vehicular structure adjacent the headliner system 10. In an embodiment, the vehicular structure is the roof of the vehicle as described above, but it is to be appreciated that the vehicular structure can be any type of structure and the invention should not be constricted by the exemplary embodiments. For example and without limitation, the component may be attached to a frame extending from the vehicular structure. These and other feature will become realized by one of ordinary skill and the invention, therefore, should not be limited thereby.

Referring to FIG. 2A, according to an embodiment, the separating means is defined by varying the thickness, $T_O$, of the second, outboard surface 14 in select areas that are remote from the portion of the headliner that defines at least a portion of the air bag passage. For purposes of this disclosure, remote shall mean that the separating means is not provided to define at least a portion of the air bag passage or allow passage of the airbag therethrough, but it should be understood that the separating means may experience contact with the airbag during deployment and the invention should not be unduly limited thereby. It is appreciated that weakened areas, doors, or the like are known to allow air bag deployment through trim structure.

In an embodiment, the second, outboard surface 14 is reduced at or around at least a portion of the perimeter of the component 22 to define the separating means. In an embodiment, the outboard surface 14 may be substantially reduced to approximately 0 mm proximate at least a portion of the perimeter 24 that surrounds the component 22.

By reducing the thickness in the foregoing manner, the headliner system generally defines a detent area 26 that surrounds at least a portion of the perimeter of the component 22. Because an absence or thinning of material proximate the detent area 26 is provided, the top and bottom film layers 16, 20 may, according to an embodiment, extend across the detent area 26 such that the middle layer 18 is absent proximate the detent area. However, if desired, a trimming operation may be conducted such that the top, bottom, and middle layers 16-20 are trimmed from the headliner 10 proximate the detent area 26.

As seen in FIG. 2A, the detent area 26, according to an embodiment, may generally define a component location area 28 where the component 22 is located over the first, inboard surface 12 of the headliner 10 and mounted the vehicular structure where there is an absence of material in the second, outboard surface of material 14. Alternatively, as seen in FIG. 2B, if desired, a component location 28 of the component 22 on the headliner 10, may be proximate the detent area 26 where a relatively reduced thickness, $T_{Or}$, of the second, outboard layer of material 14 is provided such that the relatively reduced thickness, $T_{Or}$, is slightly greater than 0 mm but less than the thickness, $T_O$, of the second, outboard layer of material 14.

Figure 3:
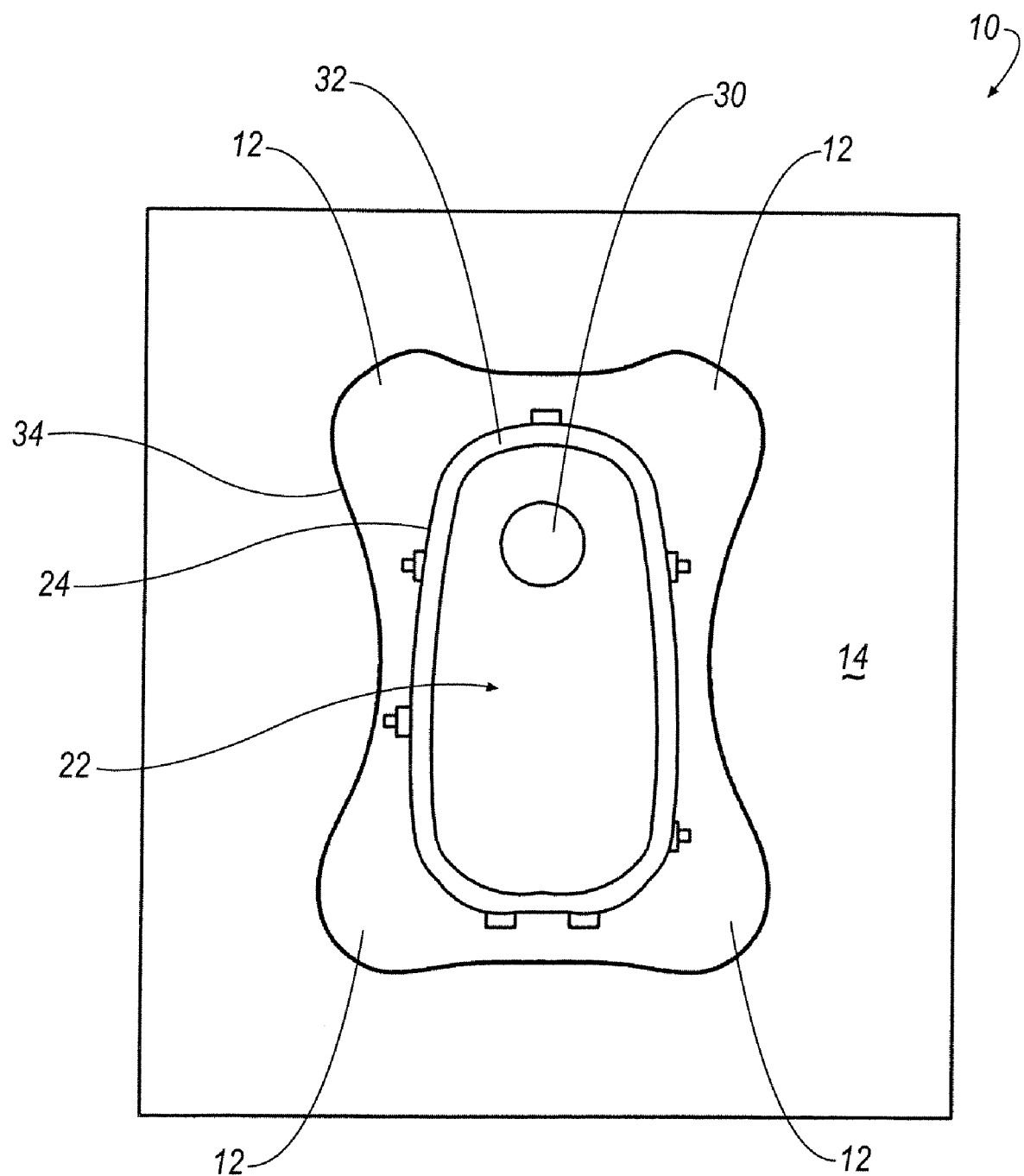
FIG. 3 is a plan view of a headliner system according to an embodiment.

Referring to FIG. 3, an outboard surface plan view of the headliner 10 and headliner component 22 is shown according to an embodiment. As illustrated, the headliner component 22 defines an opening 30, such as a slit or a hole, that permits passage of a fastener (not shown) for fastening the headliner component 22 to a mounting extension or mounting post 32 (FIG. 1A). According to an embodiment, an absence of the first, inboard layer of material 12 may be provided proximate the opening 30 to permit passage of the fastener as described above. Additionally, the headliner component 22 may include a bezel 32 that may, for example, be positioned adjacent the first, inboard layer of material 12, facing the passenger compartment area, P.

Referring to FIGS. 2A, 2B and 3, the detent area 26 may generally define a perimeter, which is shown generally at 34, that is provided proximate the component location area 28 as described above. Referring, comparatively, to FIGS. 2A and 2B, the component perimeter 24 may be bounded by the perimeter 34 of the component location area 28 (i.e., as seen in FIGS. 2A and 3), or, alternatively, the perimeter 34 of the component location area 28 may be bounded by the headliner component perimeter 24 (i.e., as seen in FIG. 2B).

Figure 1B:
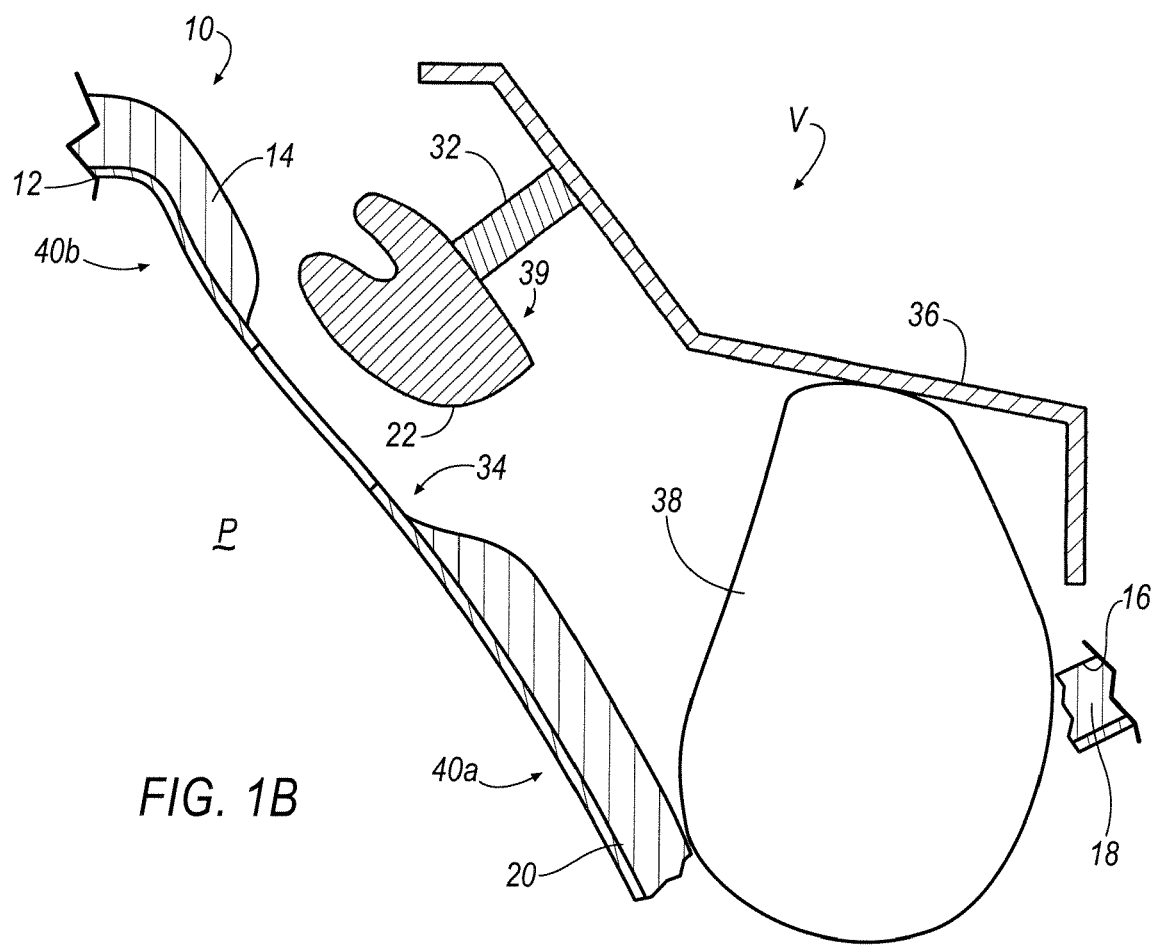
FIG. 1B is a cross-sectional view of the headliner system according to FIG. 1A illustrating an inflatable restraint moved from a stowed position to a deployed position according to an embodiment.

Referring to FIG. 1A, the component 22 is shown mounted to vehicle roof structure 36 by way of the extension or post 32 that extends from the structure 36. It will be appreciated that the structure 36 and post 32 may alternatively include a different or similar material, such as, for example, a metallic or composite material. As also seen in FIG. 1A, an inflatable restraint is shown generally at 38, which according to an embodiment, is shown disposed in a stowed position between the headliner 10 and the vehicle roof structure 36. According to an embodiment, as shown in FIG. 1B, when the inflatable restraint 38 is inflated and expands, the headliner 10 becomes separated from the component 22 at the perimeter 34 of the component location area 28, thereby causing the headliner 10 to rupture and tear proximate perimeter 34 of the component location area 28.

Referring to FIG. 1A, inflation and expansion of the inflatable restraint 38 may cause a sidewall portion 40a of the headliner 10 to break away from a roof portion 40b of the headliner 10 such that the sidewall portion 40a of the headliner 10 pivots proximate, for example, a pivot point, $X_1$, in the direction of the arrow, $D_1$, to permit the inflatable restraint 38 to expand into the passenger compartment area, P. As illustrated, the rupturing of the headliner 10 about the mounting location perimeter 34 may also cause the roof portion 40b of the headliner 10 to pivot proximate, for example, a pivot point, $X_2$, in the direction of the arrow, $D_2$.

As such, because a complete absence of, or, a substantial lack of the second, outboard layer of material 14 (as defined by the thickness, $T_O$, $T_{Or}$) is provided proximate the component 22, a separating means is provided that maintains the mounting integrity of the component 22 upon deployment of the inflatable restraint 38. Thus, the present disclosure allows for the inflatable restraint 38 to deploy and displace the headliner 10 without putting any additional strain on the component 22 and mounting extension or mounting post 32.

As associated with the prior art, when conventional headliners place an additional strain on a component 22 or a mounting extension that the component is mounted to, the conventional headliner can cause the component to change positions, thereby becoming dislodged or ejected from the conventional headliner. Accordingly, the present invention prevents a dislodging or ejection of the component by eliminating or substantially reducing the thickness, $T_O$, $T_{Or}$, of the second, outboard layer of material 14 proximate the mounting location of the component 22. Additionally, by attaching the component 22 to the mounting extension or mounting post 32, deployment of the air bag 38 can move the headliner 10 such that the position of the component 22 remains substantially unchanged. As such, the strength of the connection between the mounting extension or mounting post 32 and the vehicle frame structure 36 is greater than the torque applied to the component 22 and the mounting post or extension 32 by the headliner 10 when the air bag 38 is deployed.

Thus, by reducing the amount of material of the second, outboard layer of material 14, the overall headliner thickness, $T_H$, is reduced, and therefore, any torque imparted to the separating means by way of the expansion of the inflatable restraint 38 may be overcome by only, or, at least a reduced headliner thickness, $T_{Hr}$ (FIGS. 2A, 2B). According to an embodiment, the reduced headliner thickness, $T_{Hr}$, may be approximately equal to or less than a thickness, $T_1$, of the first, inboard layer of material 12 proximate the mounting location perimeter 34 (see, e.g., FIG. 2A); alternatively, the reduced headliner thickness, $T_{Hr}$, may be approximately less than or equal to the thickness, $T_1$, of the first, inboard layer of material 12 plus the relatively reduced thickness, $T_{Or}$, of the second, outboard layer of material 14 proximate the perimeter 34 of the component location area 28. (see, e.g., FIG. 2B).

If, for example, substitute or additional breakaway characteristics of the headliner 10 are desired, the separating means may include a line of weakening including, for example, a scoring, cutting, etching, perforation, or the like that is provided in one or more of the layers 12, 14 proximate the perimeter 34 of the component location area 28. According to an embodiment, the first, inboard layer of material 12 may be scored, perforated, or otherwise weakened proximate the mounting location perimeter 34 to allow for a "cleaner break." The cleaner break provides the potential that pieces or shards of the second, outboard layer of material 14 are not broken away when one or more of the first and second layers of material 12, 14 is/are ripped. If, for example, a relatively reduced thickness, $T_{Or}$, of the second, outboard layer of material 14 is included, a line of weakening may be provided in both the first and second layers of material 12, 14 proximate the perimeter 34 of the component location area 28, for facilitating desired breakaway characteristics.

The line of weakening provided in the second, outboard layer of material 14 may be provided by perforating, scoring, die-cutting, laser cutting, knife cutting, or the like. According to an embodiment, the line of weakening that may extend partially or completely through the first and/or second layers of material 12, 14. According to an embodiment, the line of weakening may be continuous, but, alternatively can be provided in a discontinuous manner proximate the perimeter 34 of the component location area 28, relative the component 22.

Figure 4:
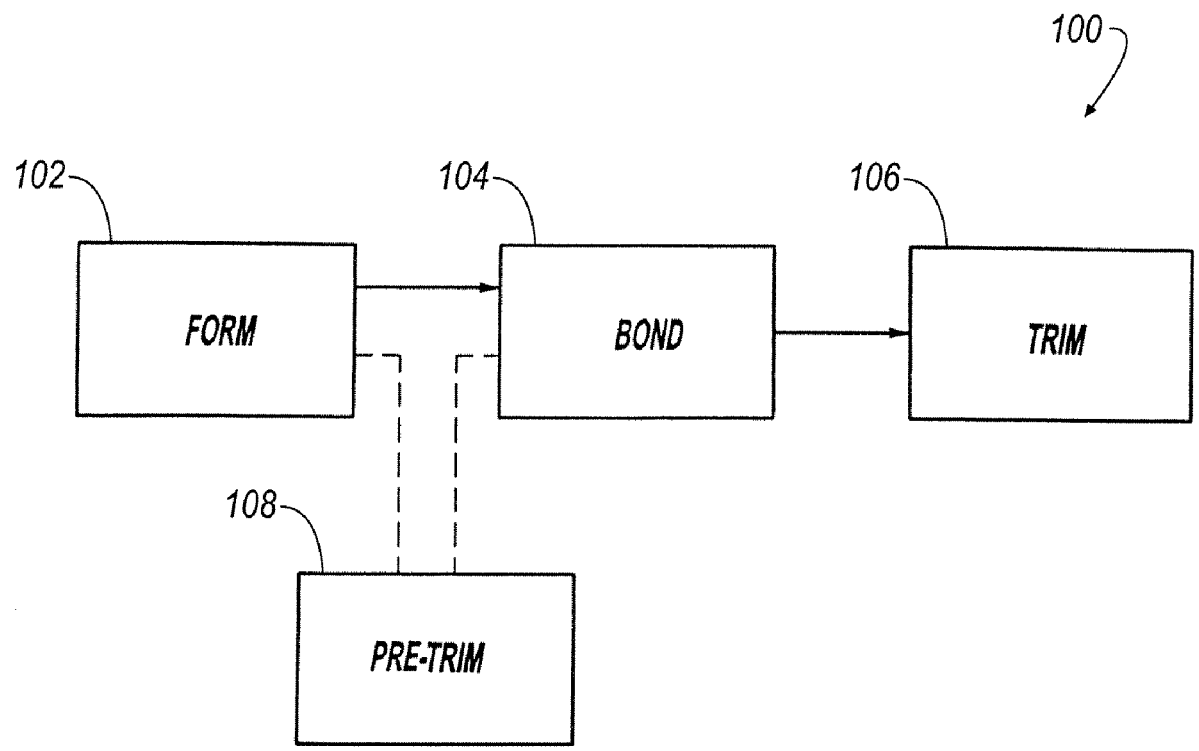
FIG. 4 is a flow diagram of a method of manufacturing a headliner system according to an embodiment.
Figure 5:
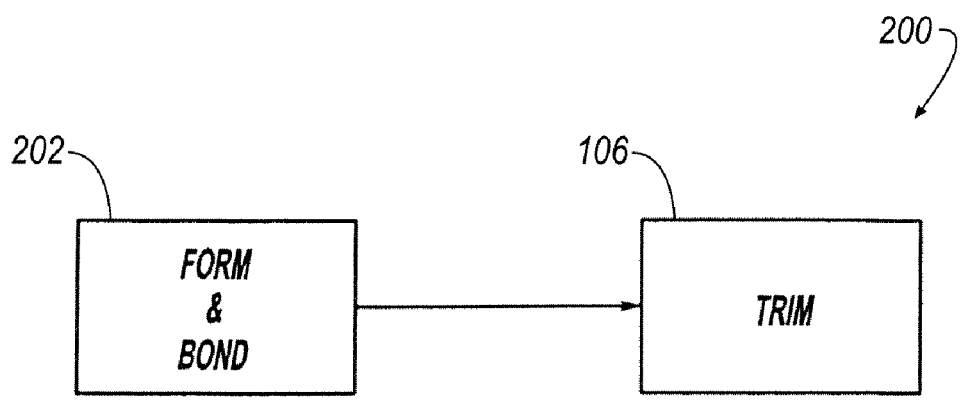
FIG. 5 is a flow diagram of a method of manufacturing a headliner system according to an embodiment.

Referring now to FIGS. 4 and 5, a method 100, 200 for manufacturing the headliner 10 is shown according to an embodiment. As shown in FIG. 4, the method 100 comprises a forming step 102, a bonding step 104, and a trimming step 106. It is preferred to use a press mold during the forming step 102 in order to form the second, outboard layer of material 14.

An absence in the thickness, $T_O$, or, the relatively reduced thickness, $T_{Or}$, may be formed in several different ways in the press mold. According to a first embodiment, dies (not shown) may be inserted in the press mold (not shown) in order to prevent the middle layer of material 18 from being inserted between the top layer of material 16 and the bottom layer of material 20. According to a second embodiment, a preformed middle layer of material 18 may be inserted into the press mold and subsequently compressed where it is desired to provide an absence in thickness, $T_O$, or, the relatively reduced thickness, $T_{Or}$. During the bonding step 104, the first, inboard layer of material 12 and the second, outboard layer of material 14 are bonded together.

According to an embodiment, it will be appreciated that the first, inboard layer of material 12 and the second, outboard layer of material 14 may bond together by using an adhesive or mechanical means. According to an embodiment, the trimming step 106 may including the trimming of the headliner 10 to provide a passage through the first, inboard layer of material 12 to allow the mounting extension 32 to extend therethrough to permit the component 22 to be attached to the mounting extension 32, or alternatively, the absence in thickness, $T_O$.

Referring to FIG. 5, the method 200 may include, according to an embodiment, a one-step process 202 that simultaneously utilizes the forming step 102 and bonding step 104 described above to create a forming-bonding step. Thus, the first, inboard layer of material 12 and the second, outboard layer of material 14 may be placed in the press mold at the same time to perform the one-step process 202. As the second, outboard layer of material 14 is being formed into the desired shape, the first, inboard layer of material 12 is being pressed into the second, outboard layer of material 14, which causes the first, inboard layer of material 12 and the second, outboard layer of material 14 to be bonded together.

Referring to FIG. 4, an optional pre-trim step 108 may be used between the forming step 102 and the bonding step 104. The pre-trim step 108 may allow the first, inboard layer of material 12 and/or the second, outboard layer of material 14 to be trimmed prior to the bonding step 104, thereby eliminating or reducing the amount of trimming conducting in the "post" trimming step 106. However, if a pre-trimming step 108 is included, the headliner 10 would have to be removed from the press to perform the pre-trim operation 108, and then, the headliner 10 would have to be placed back into the press to form the bonding step 104.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A headliner system for restricting a force transferred to a component proximate to the headliner system when an airbag is deployed through at least a portion of the headliner system, said headliner system comprising:
   a headliner defining at least a portion of an air bag deployment passage, the headliner having an inboard layer having a first thickness and an outboard layer having a second thickness, wherein the second thickness is reduced surrounding at least a portion of the component to a thickness less than or equal to the first thickness, while the combination of the first thickness and the reduced second thickness is non-zero.

2. The headliner system according to claim 1, wherein the reduced thickness fully surrounds the component.

3. A headliner system for restricting energy transfer to a component arranged proximate to the headliner system when an airbag is deployed through at least a portion of the headliner system, said headliner system comprising:

a headliner having inboard and outboard layers, the headliner defining at least a portion of an air bag deployment passage, the headliner including at least one detent area remote from the portion that defines the air bag deployment passage;

wherein the detent area is adapted to at least partially surround a perimeter of the component and defines a component post passage, the inboard layer having a thickness less than or equal to a thickness of the outboard layer in the detent area to allow separation of the component from the headliner through the detent area upon an airbag deployment.

4. An interior trim assembly, comprising:

a vehicle roof structure that supports a component;

a headliner having a potential thickness defined by
   an inboard layer defining a first layer thickness,
   an outboard layer defining a second layer thickness, wherein each of the inboard layer and the outboard layer includes a passenger-compartment-facing-surface and a vehicle-roof-facing-surface, wherein the vehicle-roof-facing-surface of the inboard layer is disposed adjacent the passenger-compartment-facing-surface of the outboard layer, and
   a component location area having a perimeter, wherein the perimeter of the component location area is frangible due to a reduced second layer thickness of the outboard layer at the perimeter, and wherein the reduced first layer thickness is less than or equal to the second layer thickness of the outboard layer.

5. The interior trim assembly according to claim 4, wherein the component includes a perimeter, and wherein the perimeter of the component location area is bounded by the perimeter of the component.

6. The interior trim assembly according to claim 4, wherein the component is arranged adjacent the first layer facing a passenger compartment area, and wherein the component is selected from the group consisting of a coat hook, a grab handle, a dome light, and a storage component.

7. The interior trim assembly according to claim 4 further comprising an inflatable restraint located between the headliner and vehicle roof structure, wherein, upon deployment of the inflatable restraint, the headliner is adapted to frangibly-break proximate across at least a portion of the perimeter of the component location area due to the reduced thickness of the second layer.

* * * * *